United States Patent
Kataoka et al.

(10) Patent No.: US 10,466,513 B2
(45) Date of Patent: Nov. 5, 2019

(54) OPTICAL WAVEGUIDE DEVICE

(71) Applicant: Sumitomo Osaka Cement Co., Ltd, Tokyo (JP)

(72) Inventors: Toshio Kataoka, Tokyo (JP); Junichiro Ichikawa, Tokyo (JP)

(73) Assignee: SUMITOMO OSAKA CEMENT CO., LTD., Toledo (JP)

(*) Notice: Subject to any disclaimer, the term of this patent is extended or adjusted under 35 U.S.C. 154(b) by 0 days.

(21) Appl. No.: 15/755,764

(22) PCT Filed: Sep. 27, 2016

(86) PCT No.: PCT/JP2016/078430
§ 371 (c)(1),
(2) Date: Feb. 27, 2018

(87) PCT Pub. No.: WO2017/168791
PCT Pub. Date: Oct. 5, 2017

(65) Prior Publication Data
US 2019/0025616 A1    Jan. 24, 2019

(30) Foreign Application Priority Data

Mar. 29, 2016 (JP) .................... 2016-066407

(51) Int. Cl.
*G02F 1/035* (2006.01)
*G02F 1/225* (2006.01)
*G02F 1/01* (2006.01)

(52) U.S. Cl.
CPC .............. *G02F 1/035* (2013.01); *G02F 1/011* (2013.01); *G02F 1/0123* (2013.01); *G02F 1/225* (2013.01); *G02F 2201/128* (2013.01)

(58) Field of Classification Search
CPC .................................................... G02F 1/0123
See application file for complete search history.

(56) References Cited

U.S. PATENT DOCUMENTS

| 7,239,764 B2 | 7/2007 | Doi et al. |
| 8,244,075 B2 | 8/2012 | Sugiyama |

(Continued)

FOREIGN PATENT DOCUMENTS

| JP | 2002048825 A | 2/2002 |
| JP | 2003233042 A | 8/2003 |

(Continued)

*Primary Examiner* — Rhonda S Peace
(74) *Attorney, Agent, or Firm* — IpHorgan Ltd.

(57) ABSTRACT

Provided is an optical waveguide device in which destabilization of a DC bias which is applied to an optical waveguide, due to a bias electrode picking up electric noise, is reduced and an operating characteristic is stable.

An optical waveguide device includes: a substrate having an electro-optic effect; an optical waveguide formed on the substrate; a modulation electrode for applying an electric field corresponding to a modulation signal to the optical waveguide; and a bias electrode for applying an electric field corresponding to a DC bias to the optical waveguide, in which in order to reduce capture of electric noise by the bias electrode, with respect to at least a part of the bias electrode, a plurality of electrode portions (b11, b12) are formed in at least one (B1) of the pair of electrodes by folding back one electric line.

9 Claims, 13 Drawing Sheets

(56) References Cited

U.S. PATENT DOCUMENTS

| | | | |
|---|---|---|---|
| 8,472,759 | B2 | 6/2013 | Sugiyama |
| 8,909,001 | B2 | 12/2014 | Miyazaki et al. |
| 9,231,728 | B2 * | 1/2016 | Sugiyama ............... H04J 14/06 |
| 2011/0188799 | A1 | 8/2011 | Sugiyama |
| 2019/0025616 | A1 * | 1/2019 | Kataoka .................. G02F 1/035 |

FOREIGN PATENT DOCUMENTS

| | | |
|---|---|---|
| JP | 2011028014 A | 2/2011 |
| JP | 2011158652 A | 8/2011 |
| JP | 2014071383 A | 4/2014 |

* cited by examiner

OPTICAL WAVEGUIDE DEVICE

TECHNICAL FIELD

The present invention relates to an optical waveguide device and in particular, to an optical waveguide device provided with a modulation electrode and a bias electrode individually in order to apply electric fields corresponding to a modulation signal and a DC bias to an optical waveguide.

BACKGROUND ART

In the optical communication field or the optical measurement field, an optical waveguide device is frequently used for an optical modulator. FIG. 1 is an example of an optical waveguide device disclosed in Patent Literature No. 1. In FIG. 1, an optical waveguide 2 is formed on a substrate 1 having an electro-optic effect, such as lithium niobate. The optical waveguide 2 is a Mach-Zehnder waveguide provided with branched waveguides (211, 212). A modulation electrode 3 for applying an electric field corresponding to a modulation signal to the optical waveguide and a bias electrode 4 for applying an electric field corresponding to a DC bias are formed along the optical waveguide.

The bias electrode is formed side by side with the modulation electrode along a length direction of the waveguide, and therefore, if the modulation electrode is made long in order to reduce a half-wavelength voltage (Vπ) which is required for a modulation operation, the length of the bias electrode becomes short. Therefore, the bias electrode has to have an electrode configuration in which the operational effect on the optical waveguide is higher.

The modulation electrode 3 is configured of signal electrodes (311, 312) and ground electrodes (321 to 323). The bias electrode configures a so-called "differential bias electrode" which is provided with a pair of electrodes (41, 42), and in which direct current (DC) bias voltages (V1, V2) are applied to the respective electrodes.

A plurality of electrode portions (411 to 413, 421 to 423) are formed along the optical waveguide in the respective electrodes configuring the bias electrode. For example, the electrode 41 has a comb-shaped structure in which the plurality of electrode portions (411 to 413) branched from one electric line are disposed in parallel. The electrode 42 also has a comb-shaped structure in a similar way.

FIG. 2 shows an example of another optical waveguide device, and the optical waveguide formed on the substrate 1 is a nested optical waveguide in which a plurality of Mach-Zehnder waveguides are disposed in a nested manner. In the optical waveguide device of FIG. 2, the bias electrode 4 is configured of two pairs of electrodes (43 and 44, 45 and 46), and at a portion where an electric field corresponding to a DC bias is applied to the optical waveguide, a plurality of electrode portions are disposed in a comb shape. The interval between the electrodes is narrow in order to enhance the operational effect on the optical waveguide.

As a modulation form which is applied to the optical waveguide device in order to realize high-frequency and large-capacity optical fiber communication, in addition to conventional intensity modulation (On-Off keying) or the like, multilevel modulation such as Quadrature Phase Shift Keying (QPSK) using phase modulation or Dual Polarization-Quadrature Phase Shift Keying (DP-QPSK), or a transmission format with polarization multiplexing incorporated into the multilevel modulation is the main stream. For this reason, the number of modulation portions which are incorporated in one substrate also increases, and accordingly, the number of locations to which a DC bias is applied also increases. As a result, a large number of electrodes each having a comb-shaped structure as shown in FIG. 1 or FIG. 2 are disposed on the substrate.

If two electrodes each having a comb-shaped structure are disposed so as to mesh with each other, the differential bias electrode functions as an antenna or a slot line due to capacitive coupling, electric field coupling, or the like at a portion having a comb-shaped structure. For this reason, in a case of functioning as an antenna, extraneous electromagnetic waves (microwaves) can be easily picked up as noise, and in a case of functioning as a slot line, electric noise propagating through the bias electrode can be easily picked up. As a result, a phenomenon occurs in which the DC bias which is applied to the optical waveguide is destabilized.

Further, if noise which is picked up increases, an electric discharge also occurs between the electrodes each having a comb-shaped structure, and thus there is also a concern that the electrode itself may be damaged.

CITATION LIST

Patent Literature

[Patent Literature No. 1] Japanese Laid-open Patent Publication No. 2003-233042

SUMMARY OF INVENTION

Technical Problem

An object of the present invention is to solve the above-described problem and provide an optical waveguide device in which destabilization of a DC bias which is applied to an optical waveguide, due to a bias electrode picking up electric noise, is reduced and an operating characteristic is stable.

Solution to Problem

In order to solve the above problem, an optical waveguide device according to the present invention has the following technical features.

(1) An optical waveguide device includes: a substrate having an electro-optic effect; an optical waveguide formed on the substrate; a modulation electrode for applying an electric field corresponding to a modulation signal to the optical waveguide; and a bias electrode for applying an electric field corresponding to a DC bias to the optical waveguide, in which in order to reduce capture of electric noise by the bias electrode, the bias electrode has at least a pair of electrodes A1 and B1 configuring a differential bias electrode, the electrode A1 has a comb-shaped structure in which a plurality of electrode portions a1 branched from one electric line are disposed in parallel, the electrode B1 has a folded structure in which a plurality of electrode portions b1 are disposed in parallel by folding back one electric line, and a part of the electrode portion b1 is disposed between the electrode portions a1 disposed in parallel.

(2) An optical waveguide device includes: a substrate having an electro-optic effect; an optical waveguide formed on the substrate; a modulation electrode for applying an electric field corresponding to a modulation signal to the optical waveguide; and a bias electrode for applying an electric field corresponding to a DC bias to the optical waveguide, in which in order to reduce capture of electric noise by the bias electrode, the bias electrode has at least a pair of electrodes A2 and B2 configuring a differential bias electrode, the electrode A2 has a folded structure in which a plurality of electrode portions a2 are disposed in parallel by folding back one electric line, the electrode B2 has a folded structure in which a plurality of electrode portions b2 are disposed in parallel by folding back one electric line, and a part of the electrode portion b2 is disposed between the electrode portions a2 disposed in parallel.

(3) In the optical waveguide device according to the above (1) or (2), a width of at least one electrode portion of the electrode portions which are involved in application of the DC bias to the optical waveguide is configured to be narrower than a width of the other electrode portion.

(4) In the optical waveguide device according to any one of the above (1) to (3), an interval between the electrode portions which are not involved in application of the DC bias to the optical waveguide is configured to be narrower than an interval between the electrode portions which are involved in application of the DC bias to the optical waveguide.

(5) In the optical waveguide device according to any one of the above (1) to (4), in the pair of electrodes configuring the bias electrode, a configuration in which an electric discharge more easily occurs than between the electrode portions which are involved in application of the DC bias to the optical waveguide is provided at a location other than the electrode portions which are involved in application of the DC bias to the optical waveguide.

Advantageous Effects of Invention

According to the present invention, the bias electrode is configured with a combination of the electrode having a comb-shaped structure and the electrode having a folded structure, or configured with two electrodes each having a folded structure. With this configuration, it is possible to exclude a configuration in which two electrodes each having a comb-shaped structure as in the related art are disposed so as to mesh with each other. As a result, it becomes possible to provide an optical waveguide device in which destabilization of a DC bias which is applied to an optical waveguide, due to a bias electrode picking up electric noise, is reduced and an operation is stable.

DESCRIPTION OF EMBODIMENTS

Hereinafter, an optical waveguide device according to the present invention will be described in detail using FIG. 3 to FIG. 13.

Figure 1:
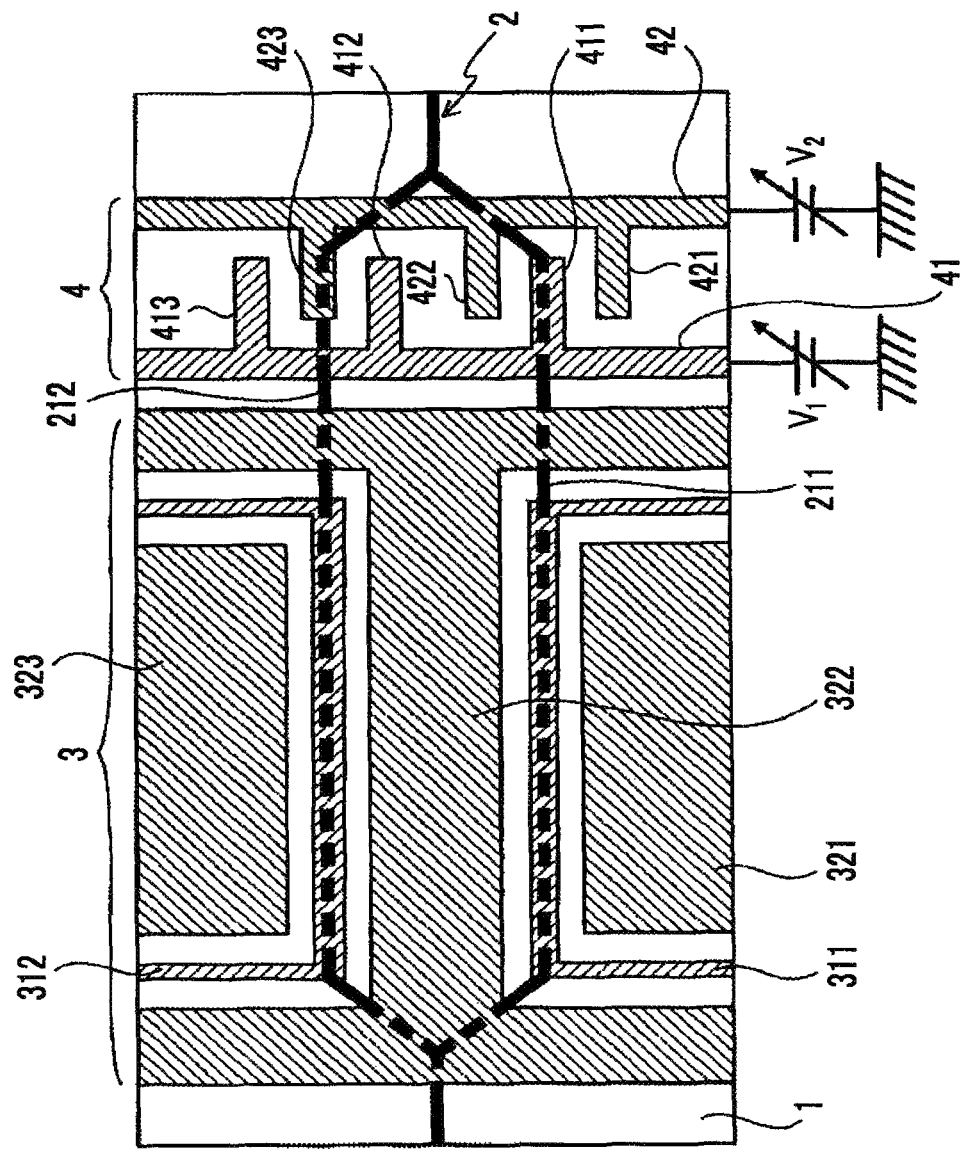
FIG. 1 is a plan view showing an example of an optical waveguide device of the related art.
Figure 2:
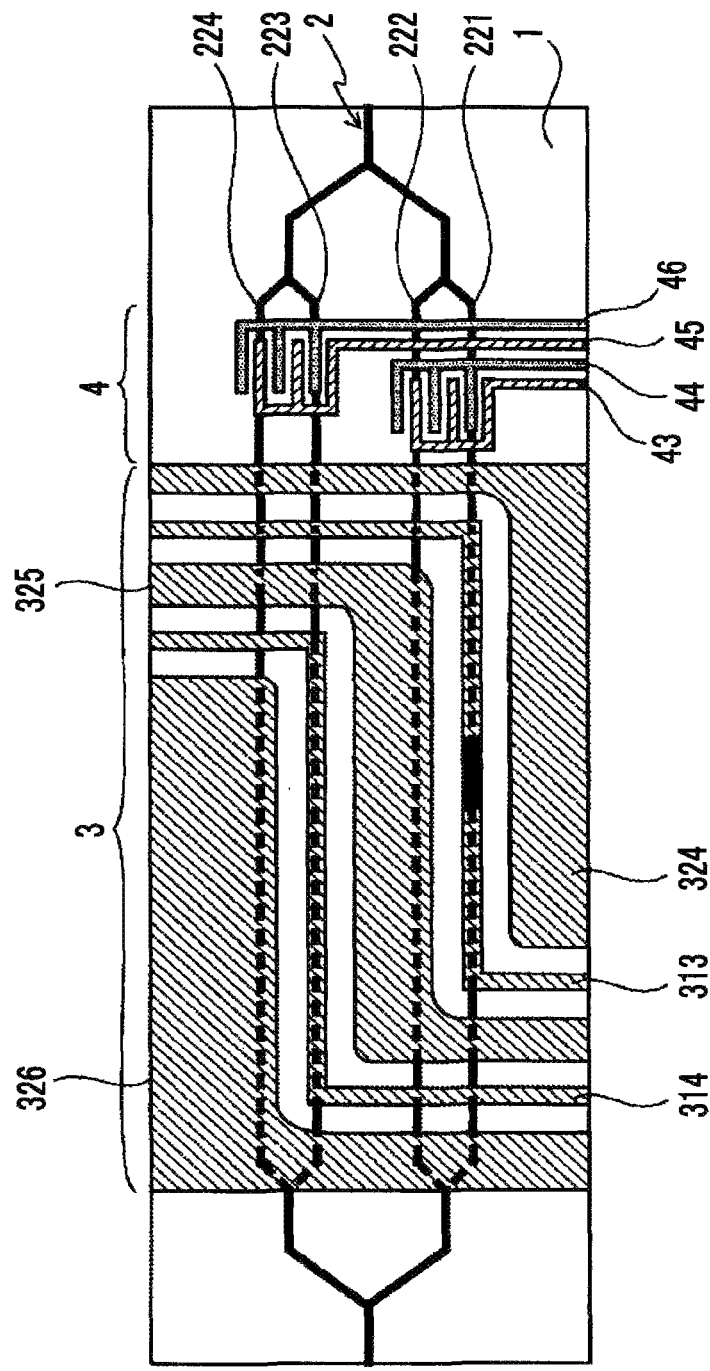
FIG. 2 is a plan view showing another example of the optical waveguide device of the related art.

An optical waveguide device according to an aspect of the present invention is directed to an optical waveguide device provided with: a substrate 1 having an electro-optic effect; an optical waveguide 2 formed on the substrate; a modulation electrode 3 for applying an electric field corresponding to a modulation signal to the optical waveguide; and a bias electrode 4 for applying an electric field corresponding to a DC bias to the optical waveguide, similar to the example of the related art shown in FIG. 1 and FIG. 2.

In particular, the optical waveguide device has the configurations of FIG. 3 to FIG. 12 as a configuration for reducing capture of electric noise by the bias electrode 4.

As the substrate 1 having an electro-optic effect, there is a substrate using a dielectric such as $LiNbO_3$ or $LiTaO_3$, or a semiconductor such as InP or Si, or the like. Also in the optical waveguide device according to the present invention, the material of the substrate is not particularly limited. However, a conventionally known dielectric or semiconductor substrate can be used. Further, also at the time of formation of the optical waveguide 2, it is possible to use a method of forming an optical waveguide by thermally diffusing Ti on a dielectric substrate made of $LiNbO_3$, or a known technique such as a ridge optical waveguide.

A configuration for reducing capture of electric noise by the bias electrode 4, which is a feature of the optical waveguide device according to the present invention, will be described. In the optical waveguide device according to the present invention, with respect to at least apart of the bias electrode, a plurality of electrode portions are formed in at least one of a pair of electrodes by folding back one electric line. In this way, even when electric noise is captured at the plurality of electrode portions, directions in which a noise current flows become directions different from each other in one electric line. For this reason, it is possible to reduce the effect of capturing the electric noise.

As specific configurations of the bias electrode, the following two configurations are exemplified.

As a first configuration, the bias electrode has at least a pair of electrodes A1 and B1 configuring a differential bias electrode, the electrode A1 has a comb-shaped structure in which a plurality of electrode portions a1 branched from one electric line are disposed in parallel, the electrode B1 has a folded structure in which a plurality of electrode portions b1 are disposed in parallel by folding back one electric line, and a part of the electrode portion b1 is disposed between the electrode portions a1 disposed in parallel.

As a second configuration, the bias electrode has at least a pair of electrodes A2 and B2 configuring a differential bias electrode, the electrode A2 has a folded structure in which a plurality of electrode portions a2 are disposed in parallel by folding back one electric line, the electrode B2 has a folded structure in which a plurality of electrode portions b2 are disposed in parallel by folding back one electric line, and a part of the electrode portion b2 is disposed between the electrode portions a2 disposed in parallel.

Examples relating to the first configuration described above will be described.

Figure 3:
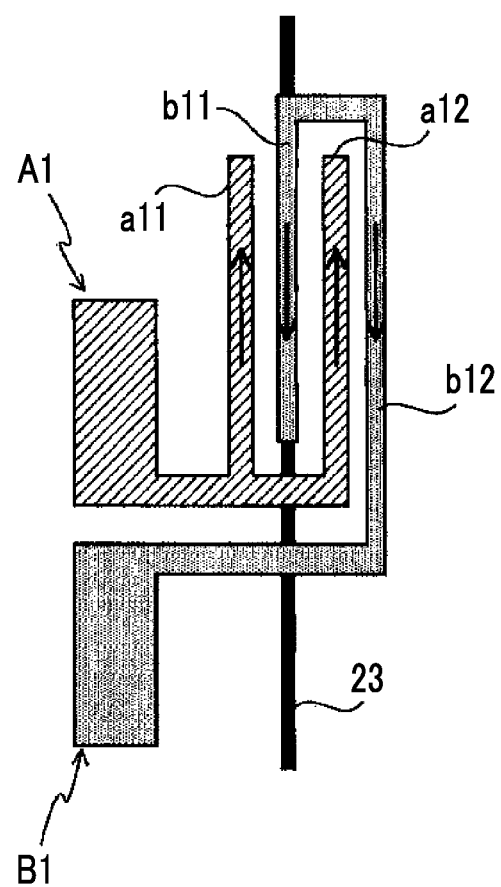
FIG. 3 is a plan view showing a first example of an optical waveguide device according to the present invention.

FIG. 3 illustrates apart of the configuration of the bias electrode. The same applies to FIG. 4 to FIG. 13 below.

FIG. 3 shows an example (a first example) in a case where an optical waveguide 23 is provided on a Z-cut type substrate. The electrode A1 on one side of a pair of bias electrodes has a comb-shaped structure, in which electrode portions a11 and a12 are formed. In contrast, the electrode B1 on the other side has a plurality of electrode portions b11 and b12 configured by folding back one electric line.

The arrows displayed on the electrode portions (a11, a12, b11, b12) of FIG. 3 are directions in which an electric current due to electric noise flows, and in the electrode A1 having a comb-shaped structure, an electric current flows in the same direction. However, in the electrode B1, in a case where it is viewed as one electric line, an electric current flows in an opposite direction to be canceled out. For this reason, capture of the electric noise by the bias electrode is reduced.

Figure 4:
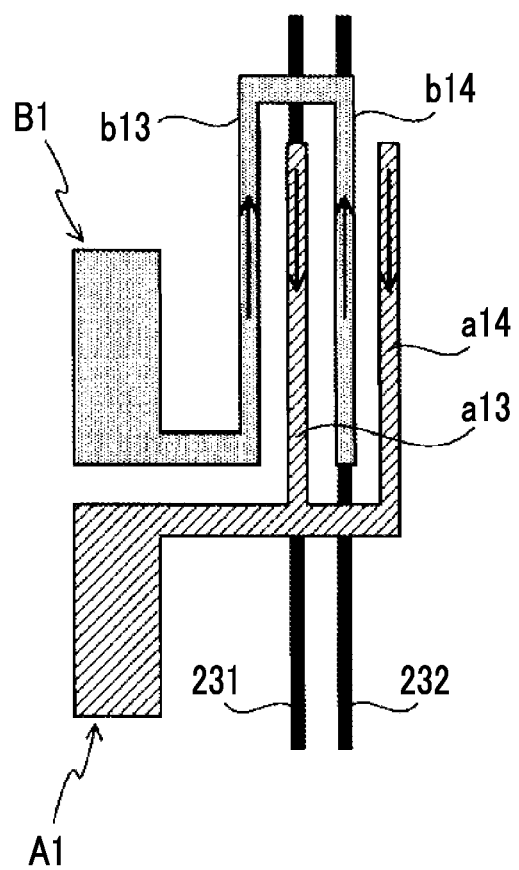
FIG. 4 is a plan view showing a second example of the optical waveguide device according to the present invention.

FIG. 4 is a second example and shows a configuration in which the DC bias is applied to two optical waveguides (231, 232) on a Z-cut type substrate. The electrode A1 has a comb-shaped structure in which a plurality of electrode portions (a13, a14) are formed. The electrode B1 has a folded structure in which a plurality of electrode portions (b13, b14) are formed. A direction in which an electric current due to electric noise flows in the electrode B1 is different, and therefore, similar to the first example, it becomes possible to reduce capture of the electric noise.

Figure 5:
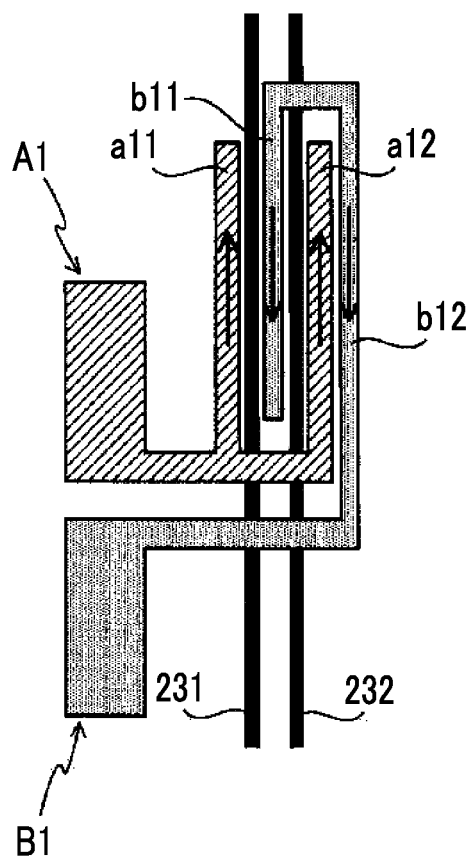
FIG. 5 is a plan view showing a third example of the optical waveguide device according to the present invention.

FIG. 5 shows a third example having a configuration in which two optical waveguides (231, 232) are provided on an X-cut type substrate and the DC bias is applied thereto. Since the structure of the electrode is the same as that of the first example, description thereof is omitted.

Figure 6:
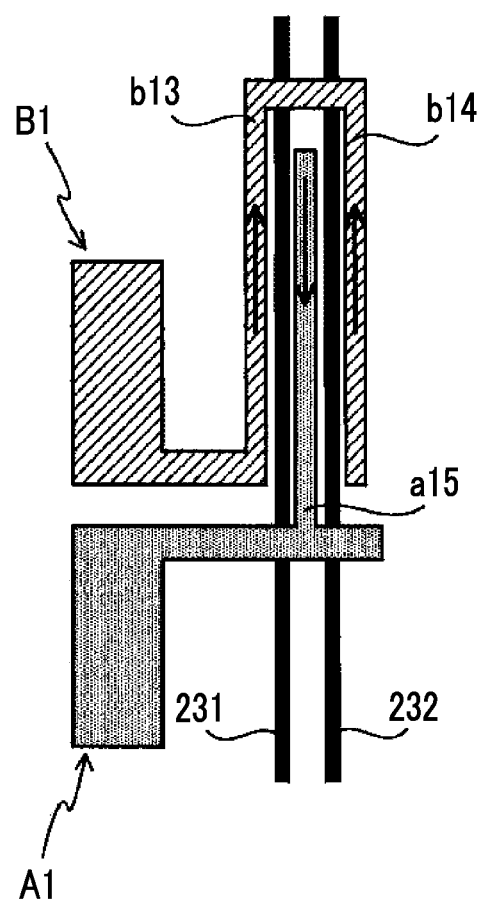
FIG. 6 is a plan view showing a fourth example of the optical waveguide device according to the present invention.

FIG. 6 shows a fourth example in which the DC bias is applied to two optical waveguides on an X-cut type substrate, similar to the third example. The structure of the electrode is the same as that of the second example. However, a part of the comb-shaped structure of the electrode A1 is omitted.

Next, examples relating to the second configuration described above will be described.

Figure 7:
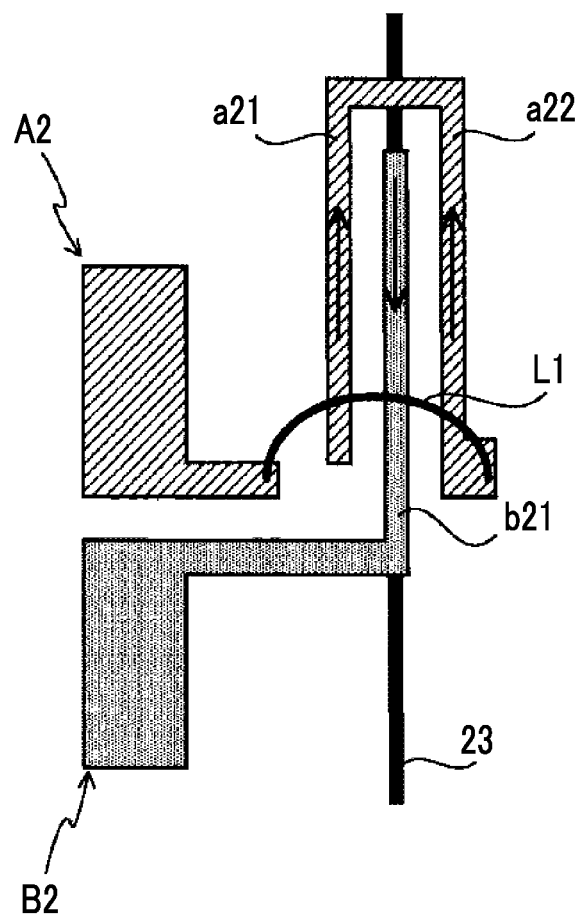
FIG. 7 is a plan view showing a fifth example of the optical waveguide device according to the present invention.

FIG. 7 shows a fifth example in which each of a pair of electrodes (A2, B2) configuring the bias electrode is configured by folding back one electric line, so that a plurality of electrode portions (a21, a22, and b21) are configured. In FIG. 7, a configuration in which the DC bias is applied to one optical waveguide 23 on a Z-cut type substrate is shown.

In the present invention, a configuration in which a plurality of electrode portions are formed in one electric line can be not only configured with a single continuous electrode, like the electrode B1 of FIG. 3, but also configured by configuring a part of an electrical line with wire bonding L1 of an Au wire or the like, like the electrode A2 of FIG. 7.

As shown in the fifth example of FIG. 7, in the electrode A2, one electric line is disposed to be folded back, and therefore, directions in which an electric current due to electric noise flows become directions different from each other in one electric line. In this way, it becomes possible to reduce capture of the electric noise.

Figure 8:
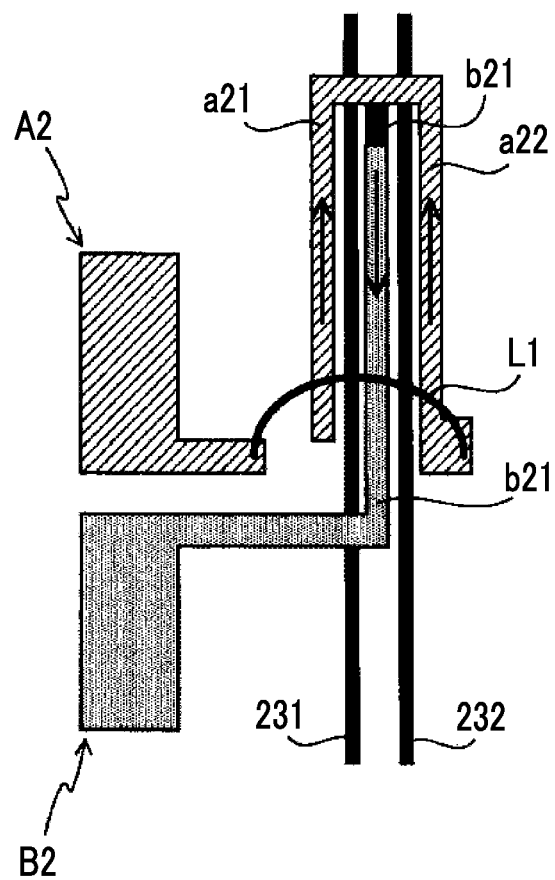
FIG. 8 is a plan view showing a sixth example of the optical waveguide device according to the present invention.

FIG. 8 is a sixth example and shows a configuration for applying the DC bias to two optical waveguides (231, 232) on an X-cut type substrate. The bias electrode is the same as that of the fifth example, and therefore, description thereof is omitted.

Figure 9:
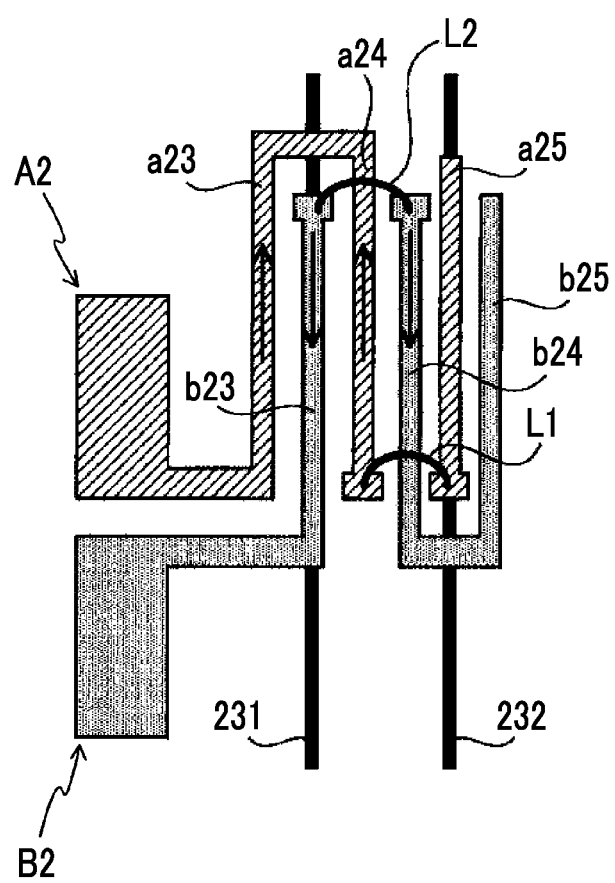
FIG. 9 is a plan view showing a seventh example of the optical waveguide device according to the present invention.

FIG. 9 is a seventh example and shows a configuration for applying the DC bias to two optical waveguides (231, 232) on a Z-cut type substrate. With respect to two electrodes A2 and B2, wire bonding (L1, L2) is provided in the middle of an electric line, and an electrode having a folded structure is formed.

Further, in addition to the first or second configuration, a configuration can be made in which the width of at least one electrode portion of the electrode portions which are involved in the application of the DC bias to the optical waveguide is narrower than the width of the other electrode portion. With this configuration, the magnitudes of electric currents flowing in the electrode portions due to electric noise become different from each other, and thus it becomes possible to reduce capture of electric noise by the electrode.

Figure 10:
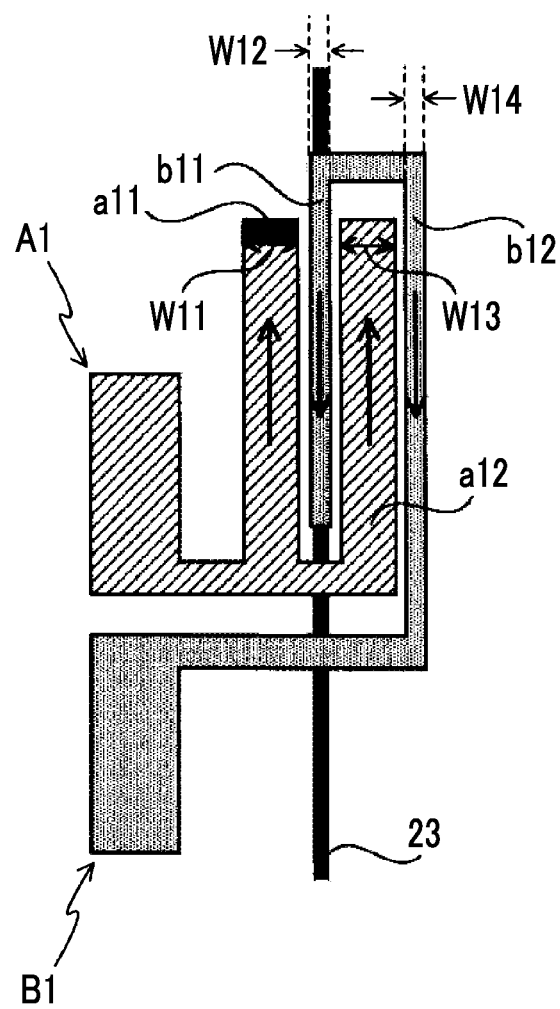
FIG. 10 is a plan view showing an eighth example of the optical waveguide device according to the present invention.
Figure 11:
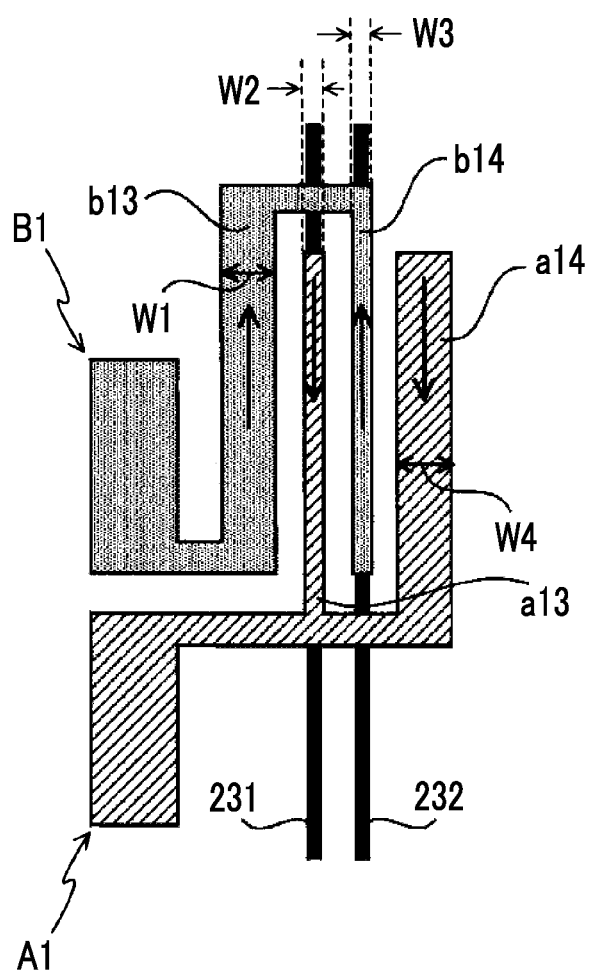
FIG. 11 is a plan view showing a ninth example of the optical waveguide device according to the present invention.

As a specific example, an eighth example shown in FIG. 10 or a ninth example shown in FIG. 11 corresponds to this. The eighth example of FIG. 10 is a modification of the first example of FIG. 3, in which a configuration is made such that the electrode widths (W11, W13) of the electrode portions (a11, a12) of particularly the electrode on one side (for example, the electrode A1 having a comb-shaped structure) are wider than the widths (W12, W14) of the electrode portions (b11, b12) of the electrode (B1) on the other side. Of course, even in different electrode portions formed in the same electrode, it is also possible to make a configuration such that the electrode widths are different from each other.

The ninth example shown in FIG. 11 is a modification example of the second example of FIG. 4. A plurality of electrode portions (a13, a14) formed in the same electrode (for example, A1) are formed so as to have electrode widths different from each other. In a case of using a Z-cut type substrate, some electrode portions (a13, b14) are disposed on the upper side of the optical waveguide, and therefore, the configuration of thickening the electrode width may be applied to portions other than the electrode portions which are disposed on the upper side of the optical waveguide.

Further, it is possible to make a configuration such that the interval between the electrode portions which are not involved in the application of the DC bias to the optical waveguide is narrower than the interval between the electrode portions which are involved in the application of the DC bias to the optical waveguide. With this configuration, the electric capacity varies between the electrode portions, and thus it becomes possible to reduce capture of the electric noise due to capacitive coupling or the like.

Figure 12:
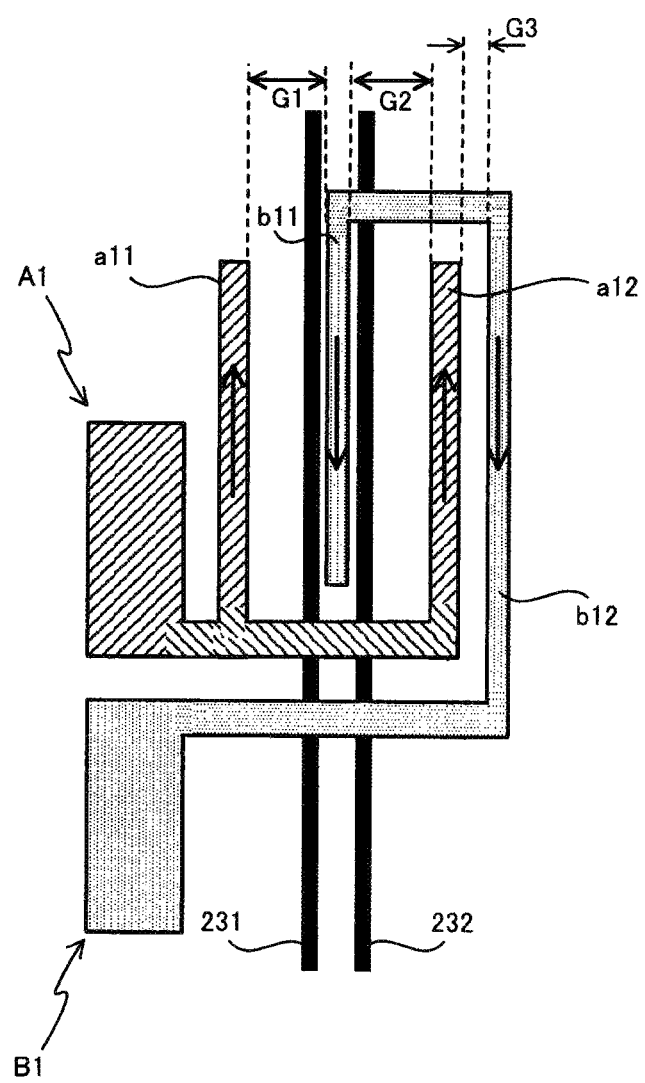
FIG. 12 is a plan view showing a tenth example of the optical waveguide device according to the present invention.

As a specific example, a tenth example shown in FIG. 12 corresponds to this. At least one of the intervals (G1, G2, G3) between the electrode portions (a11 and b11, b11 and a12, a12 and b12) is set to be different from the interval of the other electrode portions. The electric field intensity of the DC bias also depends on the interval between the electrode portions, and therefore, the electrode portions other than the electrode portions which are involved in the application of the DC bias to the optical waveguide are set so as to have different intervals.

The interval between the electrode portions which are made different may be wider or narrower than the interval between the electrode portions (a11 and b11, or b11 and a12) which are involved in the application of the DC bias. However, from the viewpoint of providing an electric discharge location (described later), it may be configured to be narrower.

Incidentally, in a case of capturing the electric noise, an electric discharge phenomenon occurs between the electrodes, and thus there is a concern that the electrode for applying an electric field to the optical waveguide may be damaged. For this reason, even in a case where the bias electrode captures the electric noise, by generating an electric discharge at a location which does not hinder the application of the electric field, it is possible to reduce damage to the necessary electrode.

Figure 13:
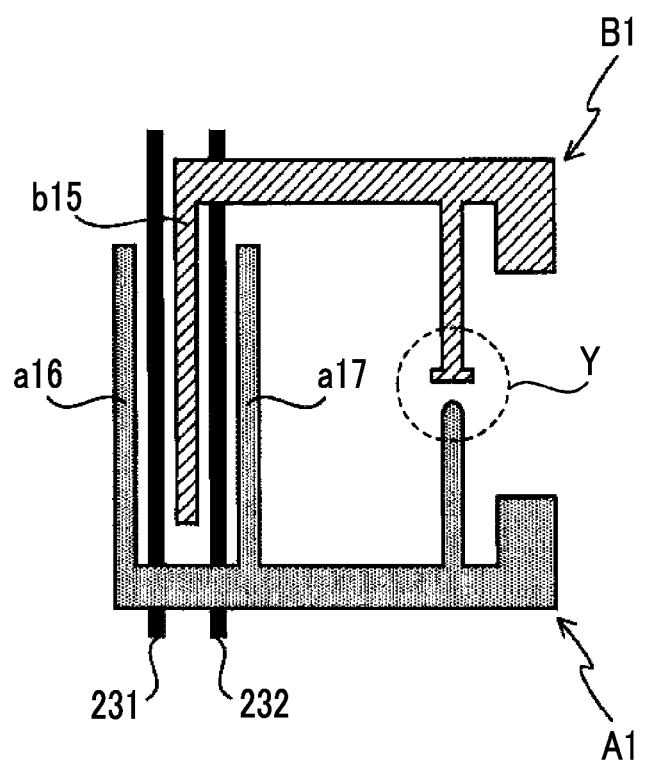
FIG. 13 is a plan view showing an eleventh example of the optical waveguide device according to the present invention.

With respect to this electric discharge countermeasure, as shown in an eleventh example of FIG. 13, in a pair of electrodes configuring the bias electrode, a configuration Y in which an electric discharge more easily occurs than between the electrode portions (a16, a17, b15) which are involved in the application of the DC bias to the optical waveguide is provided at a location other than the electrode portions which are involved in the application of the DC bias to the optical waveguide, whereby it is possible to deal with it.

A location where an electric discharge easily occurs can be easily formed by bringing a pair of electrodes locally close to each other, and the widths of the electrode portions which are not involved in the application of the DC bias are set to be narrow, as in FIG. 12. For example, it is possible to adopt various forms such as a configuration in which the interval between the electrodes of power-feeding pad portions of a pair of electrodes (for example, A1 and B1) is made narrow.

Further, even if an electric discharge occurs, in order to reduce damage to the electrode portion which applies an electric field to the DC bias, it is also possible to increase the width of the electrode portion where an electric discharge occurs. For example, as shown in FIG. 10, even if an electric discharge occurs between the electrode portions a12 and b12, by increasing the width of the electrode portion a12 or the electrode portion b12, it is also possible to reduce damage to the electrode portions (for example, b11 and a12) which are involved in the application of the DC bias.

INDUSTRIAL APPLICABILITY

As described above, according to the present invention, it is possible to provide an optical waveguide device in which destabilization of a DC bias which is applied to an optical waveguide, due to a bias electrode picking up electric noise, is reduced and an operating characteristic is stable.

REFERENCE SIGNS LIST

1: substrate having electro-optic effect
2: optical waveguide
211, 212, 221 to 224: optical waveguide (branched waveguide)
3: modulation electrode
311 to 314: signal electrode
321 to 326: ground electrode
4: bias electrode
a11 to a25, b11 to 25: electrode portion

The invention claimed is:

1. An optical waveguide device comprising:
a substrate having an electro-optic effect;
an optical waveguide formed on the substrate;
a modulation electrode for applying an electric field corresponding to a modulation signal to the optical waveguide; and
a bias electrode for applying an electric field corresponding to a DC bias to the optical waveguide,
wherein in order to reduce capture of electric noise by the bias electrode, the bias electrode has at least a pair of electrodes A1 and B1 configuring a differential bias electrode,
the electrode A1 has a comb-shaped structure in which at least two electrode portions a11 and a12 branched from one electric line are disposed in parallel,
the electrode B1 has a folded structure with no branched portion, in which at least two electrode portions b11 and b12 are disposed in parallel by folding back one electric line,
one electrode portion b11 of the electrode B1 is disposed between the electrode portions a11 and a12 of the electrode A1 disposed in parallel,
a part of the optical waveguide is disposed under the one electrode portion b11 of the electrode B1 and the optical waveguide is not disposed under the electrode portions of the electrode A1, and
an interval between the electrode portions of the electrode A1 and the one electrode portion b11 of the electrode B1 which are involved in application of the DC bias to the part of the optical waveguide and an interval between one electrode portion a12 of the electrode A1 and the other electrode portion b12 of the electrode B1 which are not involved in application of the DC bias to the part of the optical waveguide are set to be different from each other.

2. The optical waveguide device according to claim 1, wherein the electrode portions of the electrodes A1 and B1 which are involved in application of the DC bias to the part of the optical waveguide include a configuration in which a width of one electrode portion is narrower than a width of the other electrode portion.

3. The optical waveguide device according to claim 1, wherein in the pair of electrodes A1 and B1 configuring the bias electrode, a configuration in which an interval between a part of the electrode A1 and a part of the electrode B1 is made narrow for an electric discharge more easily occurring than between the electrode portions of the electrodes A1 and B1 which are involved in application of the DC bias to the optical waveguide is provided at a location other than the electrode portions which are involved in application of the DC bias to the optical waveguide.

4. An optical waveguide device comprising:
a substrate having an electro-optic effect;
an optical waveguide formed on the substrate;
a modulation electrode for applying an electric field corresponding to a modulation signal to the optical waveguide; and
a bias electrode for applying an electric field corresponding to a DC bias to the optical waveguide,
wherein in order to reduce capture of electric noise by the bias electrode, the bias electrode has at least a pair of electrodes A2 and B2 configuring a differential bias electrode,
the electrode A2 has a folded structure with no branched portion, in which a plurality of electrode portions a2 are disposed in parallel by folding back one electric line,
the electrode B2 has a folded structure with no branched portion, in which a plurality of electrode portions b2 are disposed in parallel by folding back one electric line, and
a part of the electrode portion b2 is disposed between the electrode portions a2 disposed in parallel.

5. The optical waveguide device according to claim 4, wherein an interval between the electrode portion a2 and the electrode portion b2 which are involved in application of the DC bias to the optical waveguide and an interval between the electrode portion a2 and the electrode portion b2 which are not involved in application of the DC bias to the optical waveguide are configured to be different from each other.

6. The optical waveguide device according to claim 4, wherein in the pair of electrodes A1 and B1 configuring the bias electrode, a configuration in which an interval between a part of the electrode A1 and a part of the electrode B1 is made narrow for an electric discharge more easily occurring than between the electrode portions of the electrodes A1 and B1 which are involved in application of the DC bias to the optical waveguide is provided at a location other than the electrode portions which are involved in application of the DC bias to the optical waveguide.

7. An optical waveguide device comprising:
   a substrate having an electro-optic effect;
   an optical waveguide formed on the substrate;
   a modulation electrode for applying an electric field corresponding to a modulation signal to the optical waveguide; and
   a bias electrode for applying an electric field corresponding to a DC bias to the optical waveguide,
   wherein to reduce capture of electric noise by the bias electrode, the bias electrode has at least a pair of electrodes A1 and B1 configuring a differential bias electrode,
   the electrode A1 has a comb-shaped structure in which at least two electrode portions a11 and a12 branched from one electric line are disposed in parallel,
   the electrode B1 has a folded structure with no branched portion, in which at least two electrode portions b11 and b12 are disposed in parallel by folding back one electric line,
   one electrode portion b11 of the electrode B1 is disposed between the electrode portions a11 and a12 of the electrode A1 disposed in parallel,
   a part of the optical waveguide is disposed between the electrode portion of the electrode A1 and the one electrode portion b11 of the electrode B1, and
   an interval between the electrode portion of the electrode A1 and the one electrode portion b11 of the electrode B1 which are involved in application of the DC bias to the part of the optical waveguide and an interval between one electrode portion a12 of the electrode A1 and the other electrode portion b12 of the electrode B1 which are not involved in application of the DC bias to the part of the optical waveguide are set to be different from each other.

8. The optical waveguide device according to claim 7, wherein the electrode portions of the electrodes A1 and B1 which are involved in application of the DC bias to the part of the optical waveguide include a configuration in which a width of one electrode portion is narrower than a width of the other electrode portion.

9. The optical waveguide device according to claim 7, wherein in the pair of electrodes A1 and B1 configuring the bias electrode, a configuration in which an interval between a part of the electrode A1 and a part of the electrode B1 is made narrow for an electric discharge more easily occurring than between the electrode portions of the electrodes A1 and B1 which are involved in application of the DC bias to the optical waveguide is provided at a location other than the electrode portions which are involved in application of the DC bias to the optical waveguide.

* * * * *